(12) United States Patent
Pozzi et al.

(10) Patent No.: US 9,145,081 B2
(45) Date of Patent: *Sep. 29, 2015

(54) INTEGRAL MOLDED SEAT BACK FOR COMPOSITE SEAT FRAME AND METHOD

(71) Applicant: B/E Aerospace, Inc., Wellington, FL (US)

(72) Inventors: Alexander Nicholas Pozzi, Winston-Salem, NC (US); Glenn Allen Johnson, Rural Hall, NC (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,923

(22) Filed: Jul. 17, 2014

(65) Prior Publication Data

US 2014/0327286 A1 Nov. 6, 2014

Related U.S. Application Data

(63) Continuation of application No. 13/798,995, filed on Mar. 13, 2013, now Pat. No. 8,870,291.

(60) Provisional application No. 61/610,511, filed on Mar. 14, 2012.

(51) Int. Cl.
*A47C 7/02* (2006.01)
*B60N 2/66* (2006.01)
*B60N 2/68* (2006.01)
*B64D 11/06* (2006.01)

(52) U.S. Cl.
CPC .. *B60N 2/66* (2013.01); *B60N 2/68* (2013.01); *B60N 2/686* (2013.01); *B64D 11/06* (2013.01); *B64D 11/062* (2013.01); *B64D 11/0649* (2013.01); *Y02T 50/46* (2013.01)

(58) Field of Classification Search
CPC .............. A47C 7/16; A47C 7/46; A47C 7/40; B60N 2/682; B60N 2/686; Y02T 50/46
USPC ........................... 297/452.13, 452.14, 452.31
See application file for complete search history.

(56) References Cited

U.S. PATENT DOCUMENTS

| 5,236,247 | A  | * | 8/1993 | Hewko | ........................ | 297/452.1 |
|---|---|---|---|---|---|---|
| 6,322,147 | B1 | * | 11/2001 | Leib | ........................ | 297/452.19 |
| 7,083,230 | B2 | * | 8/2006 | Kull et al. | ................... | 297/216.1 |
| 7,794,022 | B2 | * | 9/2010 | Caruso et al. | ............ | 297/452.56 |
| 8,047,613 | B1 | * | 11/2011 | Ahad | ........................ | 297/452.14 |
| 8,596,723 | B2 | * | 12/2013 | Ahad | ........................ | 297/452.14 |
| 8,870,291 | B2 | * | 10/2014 | Pozzi et al. | ............. | 297/452.13 |
| 2006/0170274 | A1 | * | 8/2006 | Moule | ....................... | 297/452.25 |
| 2010/0155536 | A1 | * | 6/2010 | Asami et al. | ............... | 244/122 R |
| 2010/0187894 | A1 | * | 7/2010 | Kismarton et al. | ...... | 297/452.18 |
| 2011/0039047 | A1 | * | 2/2011 | Carson et al. | ............... | 428/36.3 |
| 2011/0241403 | A1 | * | 10/2011 | Yamaguchi et al. | ..... | 297/452.31 |

* cited by examiner

*Primary Examiner* — Laurie Cranmer
(74) *Attorney, Agent, or Firm* — Shumaker, Loop & Kendrick, LLP

(57) ABSTRACT

An aircraft seat back including a composite material seat back frame element and a composite seat back diaphragm molded to the seat back frame element during a molding step to provide a composite aircraft seat back formed of a seat back frame element and a seat back diaphragm.

17 Claims, 3 Drawing Sheets

INTEGRAL MOLDED SEAT BACK FOR COMPOSITE SEAT FRAME AND METHOD

CROSS REFERENCE TO RELATED APPLICATION

This continuation claims priority to U.S. application Ser. No. 13/798,995 filed Mar. 13, 2013, which claims priority to U.S. Provisional Application No. 61/610,511 filed Mar. 14, 2012, the contents of which are incorporated by reference herein.

TECHNICAL FIELD AND BACKGROUND OF THE INVENTION

This invention relates to the formation of aircraft seat back structural elements. The invention essentially includes the steps of combining in a novel manner two features of current composite seat backs in a single construction. Essentially, the seat back diaphragm is combined with a seat back frame structural element in the molding of the composite seat back frame in the autoclave so that the diaphragm need not be applied during a separate manufacturing and assembly step. The composite seat back and seat diaphragm come out of the mold tool as a single structure. This technique can also enable the seat back to have the diaphragm in different positions in relation to the seat back frame.

Current manufacturing techniques typically involve manufacturing a seat back frame element out of aluminum, and separately manufacturing a fabric seat back diaphragm in the form of a sock, i.e., a fabric element with an open bottom. The diaphragm is pulled over the seat back by placing the diaphragm over the top of the seat back frame and pulling the diaphragm downwardly into its proper position. To provide a comfortable and resilient seat back, the diaphragm must be sized to be under tension after it is pulled over the seat back frame element. It is difficult to apply the diaphragm sock to the seat back frame under tension, and the diaphragm must be precisely the right size. If the diaphragm is too small it will not fit over the seat back frame or will tear either during or shortly after installation. If the seat back is too loose, the proper back support will not be provided to the seat occupant. Also, there is usually a complete hoop that goes around the front and back of the seat back frame. Molding the diaphragm into the seat back frame enables a single surface to be created, and using the techniques previously described, the surface can vary in depth. This will save weight and enable the formation of more comfortable seat backs based on designs based around the new technique described in this application. With the composite molded part arriving at the assembly station as a single unit there will be fewer parts, and no possibility of a mismatch in diaphragm and seat back frame delivery. This new technique can also be used in legrests, seat pans, headrests and armrests.

SUMMARY OF THE INVENTION

It is therefore an object of the invention to provide a composite seat back that includes a seat back diaphragm integrally molded into a seat back frame to form a unitary structure.

It is another object of the invention to provide a seat back that avoids the manufacturing step of pulling a tensioned diaphragm over a seat back frame.

It is another object of the invention to provide a method of forming a unitary seat back frame element.

These and other objects and advantages of the invention are achieved by providing an aircraft seat back that includes a composite material seat back frame element and a composite seat back diaphragm molded to the seat back frame element during a molding step to provide a composite aircraft seat back comprised of a seat back frame element and a seat back diaphragm.

In accordance with another embodiment of the invention, the composite material is carbon fiber.

In accordance with another embodiment of the invention, the diaphragm is molded to a front surface of the seat back frame element.

In accordance with another embodiment of the invention, the diaphragm is molded to and covers the front of composite seat back frame element.

In accordance with another embodiment of the invention, an upper portion of the diaphragm molded into a rear surface of the seat back frame element and a lower portion of the diaphragm is molded into a front surface of the seat back frame to form a contoured seat back support surface extending between the upper and lower portions of the seat back frame element.

In accordance with another embodiment of the invention, the diaphragm includes upper and lower outwardly-extending tabs that form molding points for molding the diaphragm to the seat back frame element, and further wherein a portion of the diaphragm extending between the tabs have a reduced width to enable it to fit between opposing side elements of the seat back frame element.

In accordance with another embodiment of the invention, the diaphragm is formed of a plurality of separate diaphragm elements molded to the seat back frame element along its length to collectively form the aircraft seat back.

In accordance with another embodiment of the invention, one of the separate diaphragm elements is positioned on a lower portion of the seat back frame element to define an outwardly-extending lumbar support section molded to a front surface of the seat back frame element.

In accordance with another embodiment of the invention, the separate diaphragm elements other than the separate diaphragm element defining the lumbar support section are molded to the rear surface of the seat back frame element.

In accordance with another embodiment of the invention, an uppermost one of the diaphragm elements is molded to a front surface of the seat frame element in a position to define a head rest.

In accordance with another embodiment of the invention, the opposing ends of the diaphragm are wrapped around and molded to opposing side elements of the seat back frame element to form opposing tubular connecting elements integrally-formed with a central diaphragm portion residing between front and rear surfaces of the seat back frame element.

In accordance with another embodiment of the invention, a method of forming an aircraft seat back is provided, and includes the steps of forming a composite material seat back frame element and a composite seat back diaphragm, and molding the composite seat back diaphragm to the seat back frame element to provide a composite aircraft seat back.

In accordance with another embodiment of the invention, the step of forming a composite material seat back frame element and a composite seat back diaphragm comprises the step of forming the composite material seat back frame element and composite seat back diaphragm of carbon fiber.

In accordance with another embodiment of the invention, the method includes the step of molding the diaphragm to a front surface of the seat back frame element.

In accordance with another embodiment of the invention, the step of molding the diaphragm to the seat back frame element comprises the step of molding the diaphragm to and covering the front of composite seat back frame element.

In accordance with another embodiment of the invention, the molding step comprises the step of molding an upper portion of the diaphragm into a rear surface of the seat back frame element and molding a lower portion of the diaphragm into a front surface of the seat back frame to form a contoured seat back support surface extending between the upper and lower portions of the seat back frame element.

In accordance with another embodiment of the invention, the method includes the steps of forming on the diaphragm upper and lower outwardly-extending tabs that form molding points for molding the diaphragm to the seat back frame element, and forming a reduced-width portion of the diaphragm extending between the tabs to enable it to fit between opposing side elements of the seat back frame element.

In accordance with another embodiment of the invention, the method includes the steps of forming the diaphragm of a plurality of separate diaphragm elements and molding the plurality of separate diaphragm elements to the seat back frame element along its length to collectively form the aircraft seat back.

In accordance with another embodiment of the invention, the method includes the step of positioning one of the separate diaphragm elements on a lower portion of the seat back frame element to define an outwardly-extending lumbar support section molded to a front surface of the seat back frame element.

In accordance with another embodiment of the invention, the method includes the step of molding an uppermost one of the diaphragm elements to a front surface of the seat frame element in a position to define a head rest.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
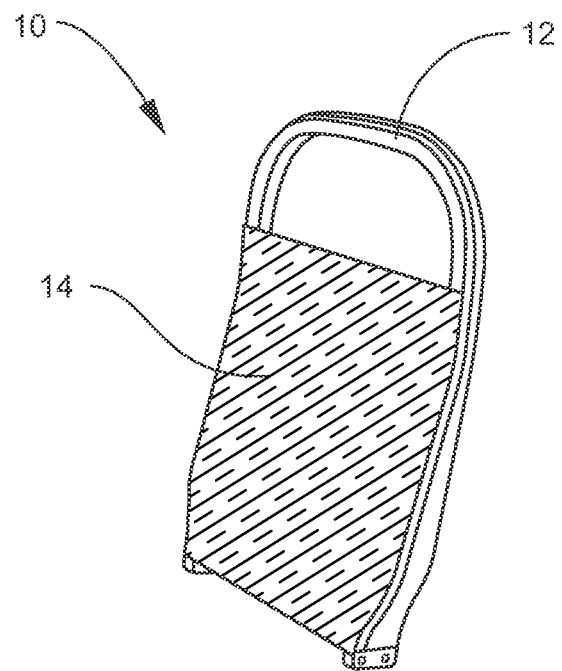
FIG. 1 is a perspective view of an aircraft seat back with a seat diaphragm molded to the front of the seat back frame.

Referring now to the drawings, a first embodiment is illustrated in FIG. 1, and includes a seat back frame 10 having a composite seat back frame element 12 to which is molded a composite seat back diaphragm 14. The diaphragm 14 is molded to the front of the seat back frame element 12 and achieves a result similar to the current method of pulling a diaphragm sock down over the frame element 12, but the material of the diaphragm 14 is molded into the frame element 12 during manufacture.

Figure 2:
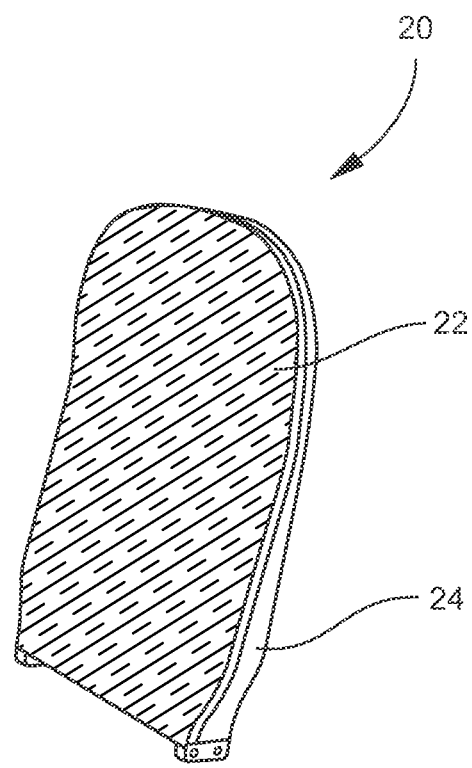
FIG. 2 is a perspective view of an aircraft seat back with a seat diaphragm molded to the front of the seat back frame according to another embodiment of the invention.

FIG. 2 illustrates a seat back frame 20 that includes a diaphragm 22 that covers the entire composite seat back frame element 24. The diaphragm 22 is molded to the composite seat frame element 24 and achieves a result similar to the current method of pulling a diaphragm sock down over the frame element 24, but the material of the diaphragm 22 is molded into the frame element 24 during manufacture.

Figure 3:
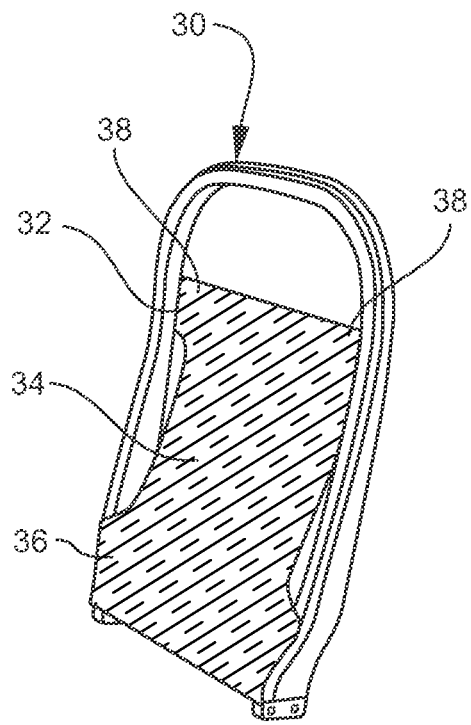
FIG. 3 illustrates an aircraft seat back with a seat diaphragm molded to the front and rear of the seat back frame at varying positions to achieve an increased seat back contour.

FIG. 3 illustrates another embodiment of the invention, including a seat back frame 30 that includes a seat frame back element 32 and a diaphragm 34. The diaphragm 34 has been cut, enabling tabs 36, 38 to be into the front and the back of the frame element 32, thus enabling a contour to be obtained from the diaphragm 34 which is not possible with the diaphragm sock method currently used.

Figure 4:
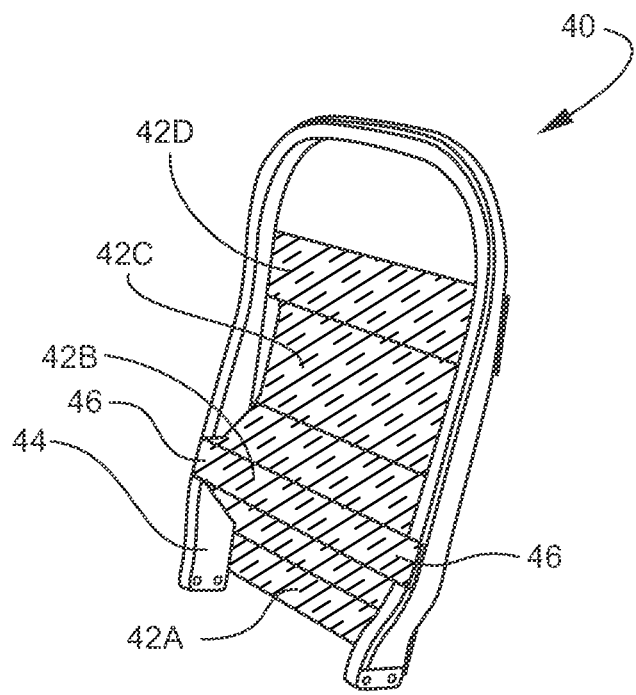
FIG. 4 illustrates an aircraft seat back with a seat diaphragm molded to the front and rear of the seat back frame, and including lumbar support elements molded to the seat back frame during autoclaving.

Referring now to FIG. 4, a seat back frame 40 includes a diaphragm 42 that is formed of a plurality of diaphragm elements 42A, 42B, 42C and 42D molded to a seat back frame element 44. Thus, various parts of the diaphragm 42 can be incorporated into a support structure enabling various comfortable positions to be created. It can also be used to provide different tensions and surfaces in order to maximize passenger comfort while reducing weight and material cost. As shown in FIG. 4, a distinct lumbar section 42B is formed, with tabs 46 allowing the lumbar section 42B to be molded to the forward surface of the seat frame element 44. Other diaphragm elements 42A, 42C and 42D are molded to the rearward surface of the seat frame element 44, as shown.

Figure 5:
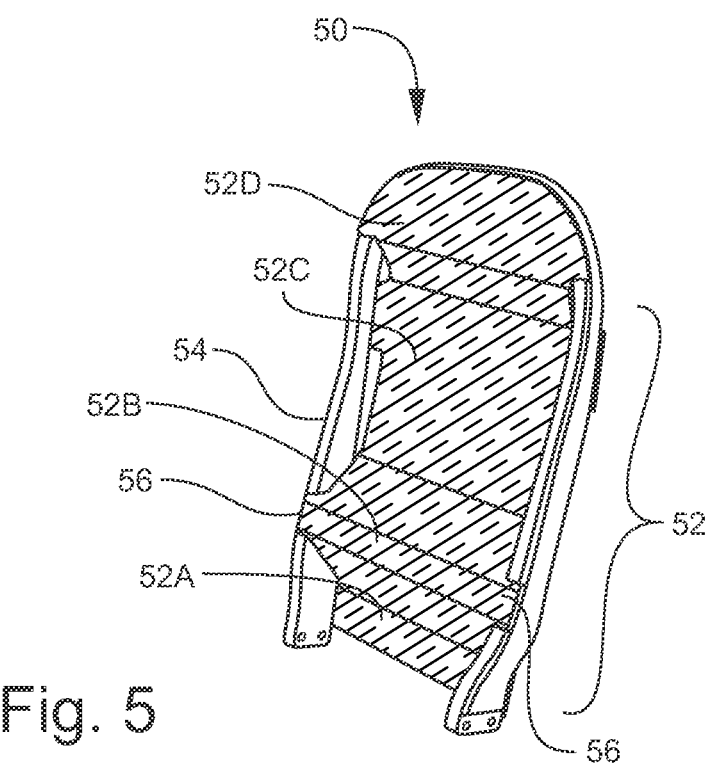
FIG. 5 illustrates an aircraft seat back with a seat diaphragm molded to the front and rear of the seat back frame, and including lumbar and head support elements molded to the seat back frame during autoclaving.

As shown in FIG. 5, a seat back frame 50 includes a diaphragm 52 that is formed of a plurality of diaphragm elements 52A, 52B, 52C and 52D molded to a seat frame element 54. Thus, various parts of the diaphragm 52 can be incorporated into a support structure enabling various seat back positions to be created in order to enhance passenger comfort. It can also be used to provide different tensions and surfaces. As shown in FIG. 5, a distinct lumbar section 52B is formed, with tabs 56 allowing the lumbar section 52B to be molded to the forward surface of the seat frame element 54. The diaphragm element 52D forms a head rest element molded to the forward surface of the seat frame element 54. The other diaphragm elements 52A, 52B, 52C are molded to the rearward surface of the seat frame element 54, as shown. Diaphragm element 52B forms a distinct lumbar section, with tabs 56 allowing the lumbar section 52B to be molded to the forward surface of the seat frame element 54.

Figure 6:
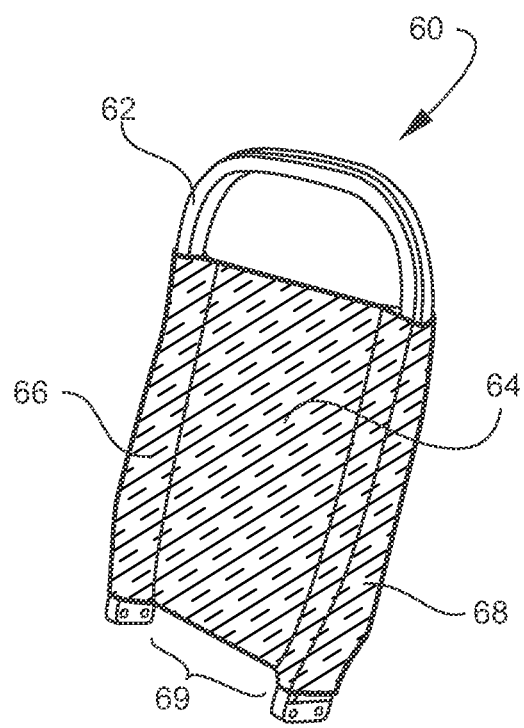
FIG. 6 is an aircraft seat back with a seat diaphragm molded to the seat back frame in a wraparound method allowing the diaphragm to reside in a middle position of the seat back structure.

Referring now to FIG. 6, another implementation of this technique involves forming a seat back frame 60 of a seat back frame element 62, and molding a seat back diaphragm 64 in a front and back wrap around method forming the opposite sides of the diaphragm 64 into tubes 66, 68 enabling the central portion 69 of the diaphragm 64 to lay in the middle position of the seat back frame element 62.

Note that in each of the examples set out above both the seat back frame element and the diaphragm element or elements are formed of a composite material, such as carbon fiber materials of known types.

A composite seat back with a molded seat back diaphragm and related method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An aircraft seat back, comprising:
   (a) a composite material seat back frame element; and
   (b) a composite seat back diaphragm formed of a plurality of separate diaphragm elements molded to the seat back frame element along its length to collectively form the aircraft seat back, wherein:
   one of the separate diaphragm elements is positioned on a lower portion of the seat back frame element to define an outwardly-extending lumbar support section molded to a front surface of the seat back frame element.

2. The aircraft seat back according to claim 1, wherein the composite material comprises carbon fiber.

3. The aircraft seat back according to claim 1, wherein one of the separate diaphragm elements is molded to a back surface of the seat back frame element.

4. The aircraft seat back according to claim 1, wherein the diaphragm is molded to and covers a front surface and a back surface of the seat back frame element.

5. The aircraft seat back according to claim 1, wherein the separate diaphragm elements other than the separate diaphragm element defining the lumbar support section are molded to the rear surface of the seat back frame element.

6. The aircraft seat back according to claim 1, wherein the diaphragm includes a plurality of upper and lower outwardly-extending tabs that form molding points for molding the diaphragm to the seat back frame element.

7. The aircraft seat back according to claim 6, wherein a portion of the diaphragm extending between the tabs have a reduced width to enable it to fit between opposing side elements of the seat back frame element.

8. An aircraft seat back according to claim 1, wherein an uppermost one of the diaphragm elements is molded to a front surface of the seat frame element in a position to define a head rest.

9. A method of forming an aircraft seat back, comprising the steps of:
   (a) forming a composite material seat back frame element and a composite seat back diaphragm, wherein the composite seat back diaphragm comprises a plurality of separate diaphragm elements; and
   (b) molding the plurality of separate diaphragm elements to the seat back frame element along its length to collectively form the aircraft seat back, wherein:
   the method further comprises molding the diaphragm to a front surface of the seat back frame element, and positioning and molding a plurality of upper and lower outwardly-extending tabs of the separate diaphragm elements to the seat back frame element.

10. The method according to claim 9, wherein the step of forming a composite material seat back frame element and a composite seat back diaphragm comprises the step of forming the composite material seat back frame element and composite seat back diaphragm of carbon fiber.

11. The method according to claim 9, wherein the step of molding the diaphragm to the seat back frame element comprises the step of molding the diaphragm to and covering the front of composite seat back frame element.

12. The method according to claim 9, and including the step of positioning one of the separate diaphragm elements on a lower portion of the seat back frame element to define an outwardly-extending lumbar support section molded to a front surface of the seat back frame element.

13. The method according to claim 9, and including the step of molding an uppermost one of the diaphragm elements to a front surface of the seat frame element in a position to define a head rest.

14. An aircraft seat back, comprising:
   (a) a composite material seat back frame element; and
   (b) a composite seat back diaphragm molded to the seat back frame element during a molding step to provide a composite aircraft seat back comprised of a seat back frame element and a seat back diaphragm, wherein:
   the opposing ends of the diaphragm are wrapped around and molded to opposing side elements of the seat back frame element to form opposing tubular connecting elements integrally-formed with a central diaphragm portion residing between front and rear surfaces of the seat back frame element.

15. The aircraft seat back according to claim 14, wherein the composite material comprises carbon fiber.

16. The aircraft seat back according to claim 14, wherein the diaphragm has a continuous, sheet-like shape.

17. The aircraft seat back according to claim 14, wherein an uppermost one of the diaphragm elements is molded to a front surface of the seat frame element in a position to define a head rest.

* * * * *